Nov. 23, 1965  A. R. CHASAR  3,219,207
LOAD SENSING AUTOMATIC STORAGE APPARATUS
Filed July 31, 1963  3 Sheets-Sheet 1

INVENTOR.
ANTHONY R. CHASAR
BY

ATTORNEYS.

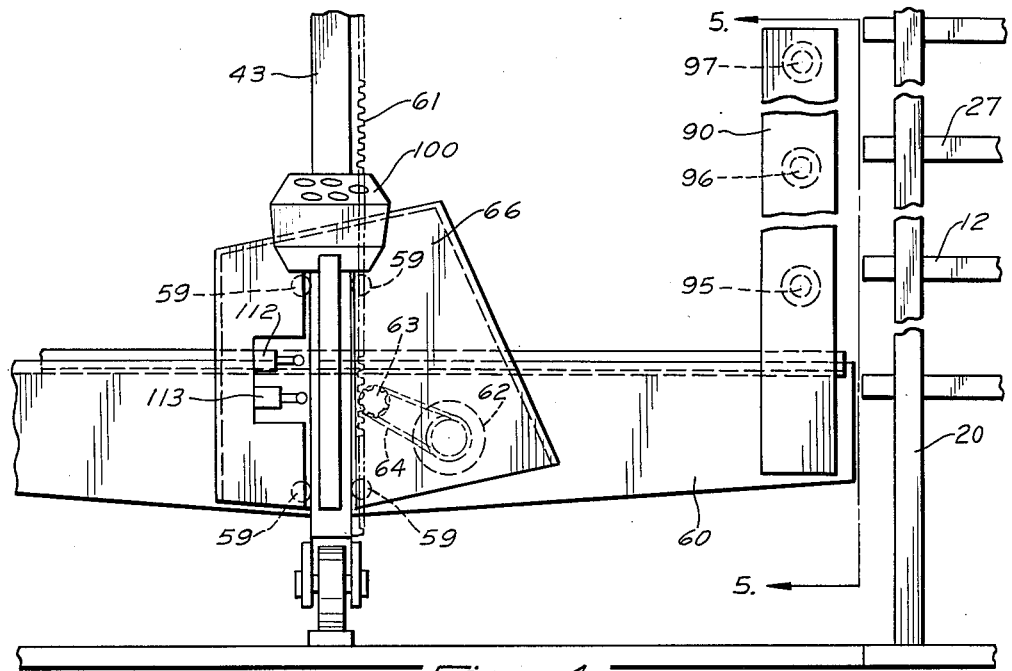
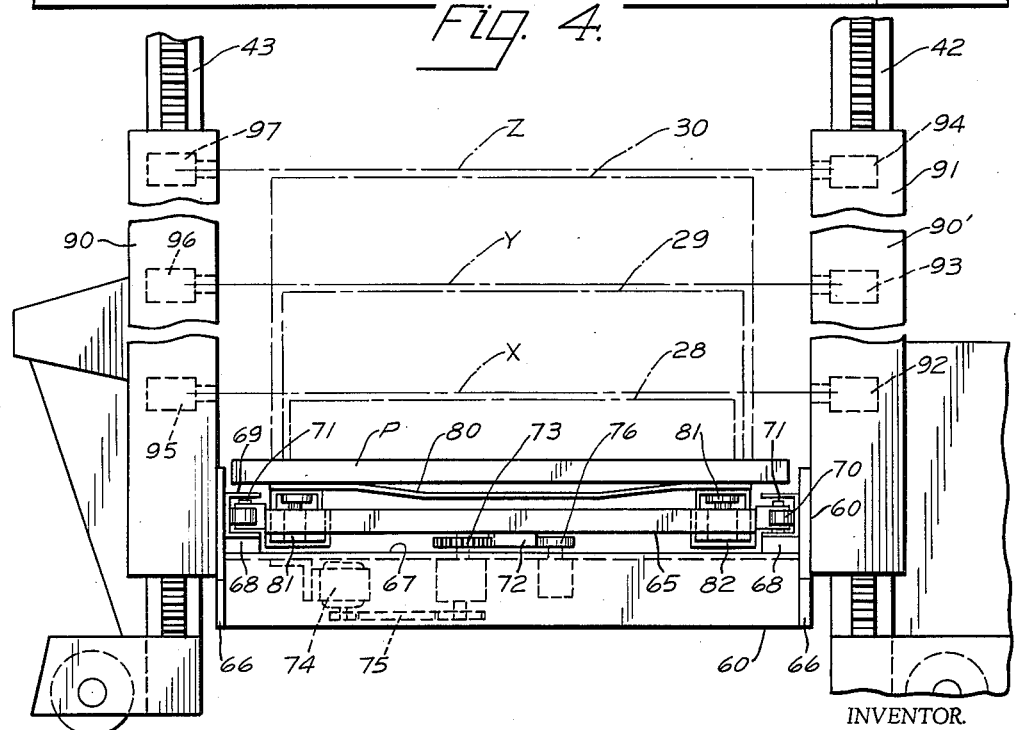

INVENTOR.
ANTHONY R. CHASAR
BY

ATTORNEYS.

United States Patent Office 3,219,207
Patented Nov. 23, 1965

3,219,207
LOAD SENSING AUTOMATIC STORAGE APPARATUS
Anthony R. Chasar, Mentor, Ohio, assignor to The Triax Company, Cleveland, Ohio, a corporation of Ohio
Filed July 31, 1963, Ser. No. 299,015
20 Claims. (Cl. 214—16.4)

This invention refers to automatic storage apparatus for automatically storing loads in a plurality of storage openings and particularly to means for determining that loads exceeding predetermined sizes will not be deposited in storage openings which have not been designated to receive them.

An exemplary storage apparatus of the type referred to comprises parallel rows of vertically and horizontally aligned load support means having an aisle therebetween and a mechanized carrier disposed in the aisle, which said carrier is movable in said aisle for delivering a load to or retrieving it from a selected one of said support means. The carrier has a main frame which is movable both vertically and horizontally and from which an extractor frame is movable laterally into the load support means. The extractor carries means for lifting a load from or depositing it on any one of said support means. Apparatus of this type is fully disclosed in copending application Serial No. 66,776, filed November 2, 1960 and entitled Mechanical Load Handling, Transfer and Storage Equipment, now United States Patent No. 3,139,994, issued July 7, 1964.

The present invention is concerned with means for sensing the height of a load either as it is moving onto the carrier or as it is moving off of said carrier and onto a load support means. The load support means of the type herein disclosed are adapted to receive loads of various heights, and the sensing means is effective to prevent a high load from being stored on a support means which has been designated for the support of relatively lower loads only.

Accordingly, the general object of this invention is to provide means for sensing the heights of loads being delivered to a selected support means in an automatic storage system.

Another object of this invention is to provide load sensing means of the above type which automatically rejects oversized loads at designated support means.

A further object of the invention is to provide apparatus having the above characteristics wherein a rejected load is automatically returned to the start position adjacent to the pick-up and discharge station.

Still another object is to provide, in the above apparatus, means preventing loads in excess of a maximum height from leaving the pick-up and discharge station.

Yet another object of this invention is to provide means for selectively varying the maximum heights of load which can be stored on a given load support means.

Further objects of the invention and the invention itself will be understood from the following description of one embodiment of the invention as disclosed in the accompanying drawings in which:

FIG. 4 is an enlarged end view of the carrier, partially broken away;

FIG. 5 is a side view of the carrier as seen from the line 5—5 of FIG. 4, partially broken away.

Figures 1, 2, 3:
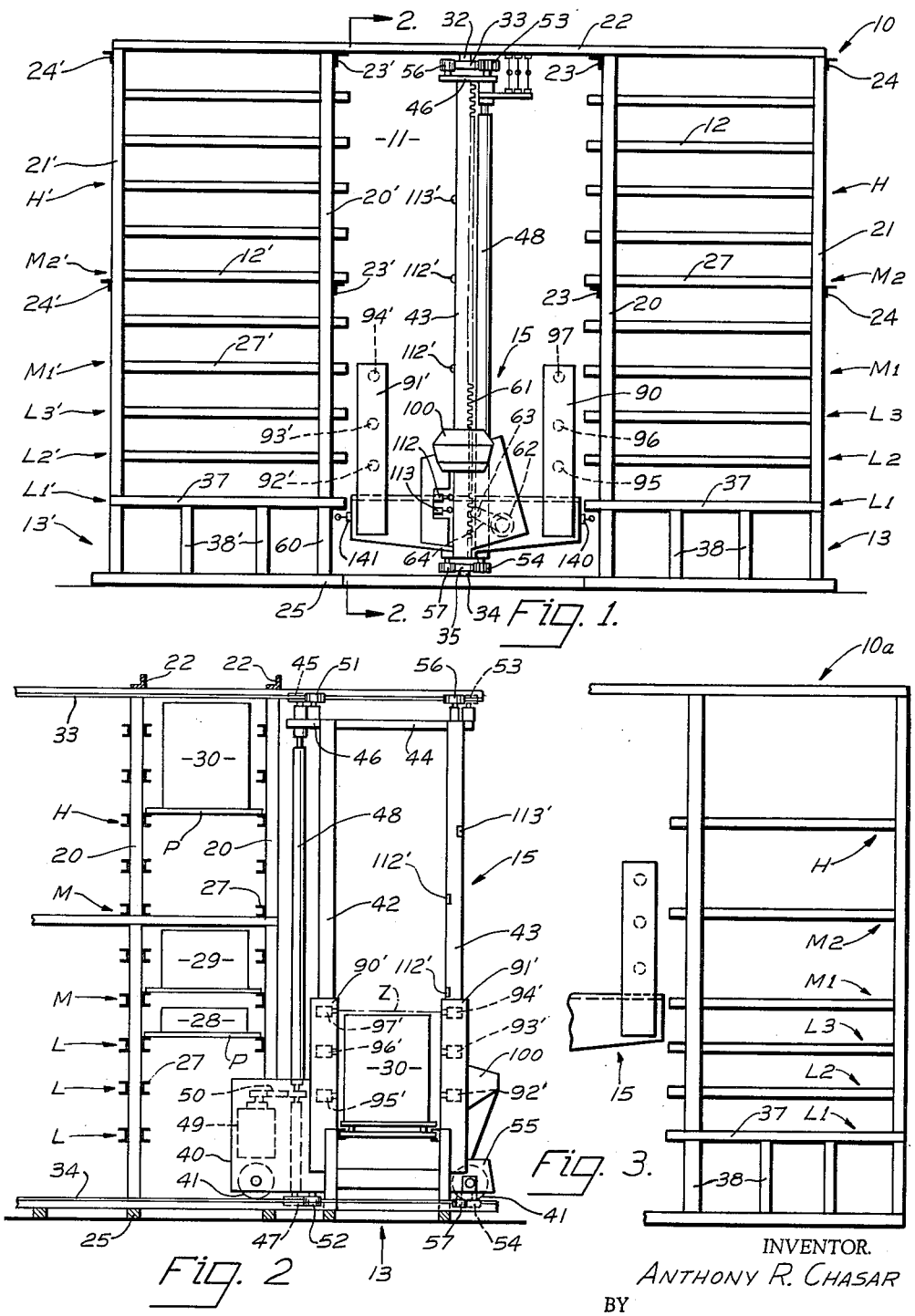
FIG. 1 is an end elevation of a storage frame having an aisle in the middle thereof and a carrier disposed in said aisle.
FIG. 2 is a side elevation of the carrier and a portion of the storage frame as seen from the line 2—2 of FIG. 1.
FIG. 3 is an end elevation of a modified storage frame partially broken away.

Referring now to the drawings and particularly to FIGS. 1 and 2, the storage apparatus as herein described comprises a storage frame 10 having a central aisle 11 flanked on either side by a row of vertically and horizontally aligned load support means 12 or 12'. At the end of each said row there is provided a pick-up and discharge station 13 or 13', said pick-up and discharge stations being hereinlater referred to simply as P & D stations. A load carrier 15 is disposed in the aisle 11 and is movable vertically and horizontally in said aisle to deliver a load to any selected one of said support means.

The storage frame 10 is skeletal in form and comprises parallel rows of like and uniformly spaced aisle posts 20 and 20', disposed on either side of the aisle 11, and parallel rows of outer posts 21 and 21', disposed laterally outwardly directly opposite the aisle posts 20 and 20' respectively. The aisle and outer posts which are aligned perpendicular to or laterally of the aisle 11 are connected together across their upper ends and across said aisle by cross members 22. The individual rows of aisle posts 20–20' and outer posts 21–21' are connected in a direction parallel with the aisle 11 by longitudinal stringers 23–23' and 24–24' respectively. And the laterally aligned aisle and outer posts are connected together across their lower ends and across said aisle by base members 25.

The load support means 12 comprise channel shaped members hereinafter referred to as load channels 27. Each load channel 27 is connected adjacent to its ends to laterally aligned aisle and outer posts 20 and 21. As best shown in FIG. 2, said load channels are secured to the posts at their webs with the open sides of the channels facing the adjacent pair of laterally aligned aisle and outer posts, and said load channels are disposed in opposite pairs between adjacent of said pairs of posts along the aisle whereby each said pair of load channels affords an individual load support means. Each load, shown at 28, 29, or 30 in FIG. 2, rests upon a pallet P which is bridged across opposite load channels 27 in its stored condition.

In a similar manner, adjacent pairs of aisle and outer posts 20' and 21' carry load channels 27' on the opposite side of the aisle 11 thereby providing the above referred to support means 12'.

An upper rail 32 is carried dependently by the cross members 22 generally in the middle of and parallel with the aisle 11, and a lower rail 34 is supported by the base members 25 below and parallel with the upper rail 32. Said rails 32 and 34 carry racks 33 and 35 respectively which said racks have their toothed edges directed laterally toward the aisle posts 20.

The P & D station 13 comprises a pair of channel members 37 disposed at the same level as the lowermost support means 12 or 12' and having their open sides facing each other in the same manner as the pairs of channel members 27. The channel members 37 are spaced apart the same distance as the pairs of channel members 27 and are supported by upright posts 38. The P & D station 13' is disposed opposite the station 13 and similarly comprises channel members 37' and upright posts 38'.

The foregoing skeletal frame construction affords a plurality of storage spaces defined on either side thereof by the aisle posts 20 or 20' and their corresponding outer posts 21 or 21' which said spaces are located at different levels by the opposite pairs of load channels 27. This leaves the storage space between any two adjacent aisle or outer posts virtually free from obstructions throughout the entire vertical length of said posts. The result is that a load positioned at one support means 12 or 12′ need not be limited in height by the next highest support means. In other words, with this type of construction a load may extend upwardly past one or more support means immediately thereabove as illustrated by the medium-sized load 29 or the large-sized load 30 in FIG. 2.

The load carrier 15 moves horizontally along the aisle 11 by means of the rails 32 and 34 and their associated racks 33 and 35. Said carrier has a horizontally movable frame 40 mounted for rolling engagement upon the lower rail 34 by wheels 41. Said frame 40 has two vertically disposed, parallel masts 42 and 43 which are spaced apart in a direction parallel with the aisle 11 and are connected together at their upper ends by a cross member 44. Driving means for the frame 40 comprises an upper pinion 45, carried by a mounting plate 46 adjacent to the upper end of the mast 42, and a lower pinion 47, carried by said frame 40 adjacent to the lower track 34. The pinions 45 and 47 mesh with the upper rack 33 and the lower rack 35 respectively and are connected to rotate in unison by a drive shaft 48. Said drive shaft is, in turn, connected to a reversible electric motor 49 by pulley and belt means 50. The pinions 45 and 47 are maintained in mesh with said racks by back-up rollers 51 and 52 which are carried by the mounting plate 46 and the lower end of the frame 40 respectively in contact with the opposite sides of said racks. An idler pinion 53 is carried adjacent to the upper end of the mast 43 in mesh with the rack 33, and an idler pinion 54 is mounted to a wheel housing 55 in mesh with the rack 35. The rollers 53 and 54 are disposed generally opposite a pair of idler rollers 56 and 57 carried adjacent to the upper end of the mast 43 and by the wheel housing 55 respectively in contact with the smooth sides of the racks 33 and 34.

The horizontally movable frame 40 carries a vertically movable frame 60 which engages the masts 42 and 43 in any suitable manner such as by rollers 59 (FIG. 4). The mast 43 carries a vertically disposed rack 61, and the frame 60 carries an electric motor 62 which drives a pinion 63. The pinion 63 meshes with the rack 61 to drive the frame 60 vertically along the masts 42 and 43.

An extractor 65 (FIG. 5) is mounted within the vertically movable frame 60 for lateral movement out of said frame and into the load channels 27, 27′, 37 or 37′, of a load support means 12 or 12′ or a P & D station 13 or 13′. The vertically movable frame has a pair of laterally directed, upright walls 66 connected by a base 67. A pair of spacers 68 are disposed adjacent to said walls upon which are mounted a pair of load channels 69 which have the same spacing and relationship as the pairs of load channels 27, 27′, 37 or 37′. The extractor 65 is equipped along its side edges with axially vertical rollers 70 and axially horizontal rollers 71 by means of which said extractor can move smoothly out of the vertically movable frame and into any load support means or the load channels of either P & D station.

Driving means for laterally moving the extractor comprises a laterally directed rack 72 depending from said extractor and meshing with one or more pinions 73. The pinions 73 are carried by the base 67 and are driven by a reversible electric motor 74 through belt and pulley means 75. Idler rollers 76 back up the pinions 73 and maintain them in mesh with the rack 72. When the motor 74 rotates the pinions 73 in one direction, the extractor 65 is moved laterally out of the vertically movable frame 60 toward the support means on one side of the aisle 11, and when said motor is reversed, said extractor is moved either back into the vertically movable frame or laterally out of said frame 60 toward the support means on the other side of said aisle.

A platform 80 is mounted for vertical movement relative to the extractor 65 by a plurality of fluid operated jacks 81 seated in U-shaped brackets 82 carried by said extractor. The upper ends of said jacks support the platform 80 which is movable by said jacks from a position above the level of the upper flanges of the load channels 69 to a level below said upper flanges. Said platform is raised when carrying a load whereby the extractor, when moving from the load channels 69 into aligned load channels 27, 27′, 37, or 37′, carries the load above the level of the upper flanges of the channels into which it is moving. Subsequent lowering of the platform leaves the pallet upon which the load is mounted bridged across the load channels of a support means or a P & D station. In picking up a load from a support means or a P & D station, the empty platform 80 is disposed in its lowered position to pass beneath the load whereby subsequent raising of the platform will lift the load off of the flanges upon which it was seated.

The vertically movable frame 60 is substantially rectangular in shape and is provided at the corners thereof with four upright supports 90, 91 (FIG. 5), 90′, and 91′ (FIG. 2). These supports project upwardly a substantial distance with each pair (90–91 or 90′–91′) flanking an exit-entrance side of the carrier 15. When a load is transferred between said carrier and a load support means 12′ or the P & D station 13′, said load passes between the supports 90′ and 91′.

Referring now to FIG. 5, the support 91 carries three photoelectric cells 92, 93 and 94 disposed at different levels, and the support 90 carries three light sources 95, 96 and 97 disposed at corresponding levels. The light source 95 is disposed lowest on the support 90 and projects a horizontal beam X into the cell 92; light source 96 similarly projects a horizontal beam Y into the cell 93 at a medium level; and light source 97 projects a beam Z into the cell 94 at the highest level. As shown in broken lines, a low load 28 is adapted to pass under the beam X, a medium height load 29 is adapted to pass under the beam Y, and a high load 30 is adapted to pass under the beam Z. The general purpose of the photoelectric cell arrangement set forth above is to sense when an excessively high load is moving from a P & D station onto the carrier or when an excessively high load on said carrier is moving onto a selected load support means 12 or 12′. An over-height load will break one of the light beams and cause the extractor motion to stop and reverse itself and the carrier to return the load to one of the P & D stations or to the start position.

As shown in FIGS. 1 and 2, the supports 90′ and 91′ are substantially identical to the supports 90 and 91. Support 91′ carries photoelectric cells 92′, 93′, and 94′, and support 90′ carries corresponding light sources 95′, 96′, and 97′. The operation of the sensing apparatus when a loading is moved between the supports 90′ and 91′ is the same as when a load is moved between the supports 90 and 91 as will herein later become readily apparent.

The above referred to copending application fully discloses automatic control means for actuating a load carrier of the type herein illustrated. Generally, such control means comprise electrical circuits and means for energizing said circuits whereby the carrier is caused to pick up or deposit a load at a P & D station, move said load from a start position adjacent to the P & D station to a selected load support means, or pick up a load at a selected support means and return it to said start position. Initiation of a delivery or pick-up cycle is effected by a plurality of manual selector switches located on a console 100 which is attached to the carrier and travels therewith (FIGS. 1, 2, 4 and 5 of the present application).

The carrier 15 in the present application is normally positioned, when not in use, at the start position adjacent to and between the P & D stations 13 and 13′ with the vertically movable frame 60 so disposed that the extractor 65 is slightly below the level of the load channels 37 and 37′ and the lowermost or first level of load channels 27 and 27′. A load which is to be stored in the storage frame 10 is first positioned by any suitable means such as a lift truck, upon a P & D station. Upon actuation of proper selector switches, sequential circuits to the motors 62 and 74 then cause the vertically movable frame 60 to move upwardly into alignment with the channel members 37 and 37' and said extractor to move laterally into the selected P & D station. Fluid is then automatically delivered to the jacks 81 by a pump (not herein illustrated) to cause the platform 80 to raise and lift the load off of the P & D station whereupon the above movements of the extractor and vertically movable frame are reversed and the carrier returns to the start position. A predetermined load support means 12 or 12' is then selected by other of the selector switches on the console 100. Sequential circuits to all of the motors 49, 62 and 74 and to the pump then cause the following to happen: the carrier moves horizontally along the aisle to a selected vertical row of load support means, the frame 60 moves up to the level of selected load support means, the extractor moves into said selected support means, the platform lowers and deposits the load on said selected support means, the extractor returns to the frame 60, the frame 60 lowers to a position just below the first level of support means, and the carrier returns horizontally along the aisle back to the start position adjacent to the P & D stations. Means are also provided for causing the carrier, in an unloaded condition, to move directly from the start position to a selected load support means, pick-up a load therefrom by raising the platform 80, and return the load to the start position. The carrier can also be subsequently caused to deposit the retrieved load upon the load channels of a P & D station.

It will be understood that the above disclosed sequence of movements and the control means for providing the movements as set forth in the referred to copending application are exemplary only of one operating apparatus to which the present invention may be applied and are not intended as a limitation of this invention.

From the foregoing it will be seen that there are provided circuits for moving the carrier and its associated frames in one direction to a P & D station or to a selected load support means. These circuits are hereinafter referred to simply as "forward selector circuits." Other circuits are provided for returning the carrier to the start position from a P & D station or from a selected load support means, and these latter circuits are hereinafter referred to simply as "reverse circuits." For purposes of simplification and ready understanding of the present invention, the means providing the forward selector circuits and reverse circuits have been illustrated in the electrical diagram of FIG. 6 in the form of two dotted rectangles or circuit blocks 110 and 111 appropriately labeled "Forward Selector Circuits" and "Reverse Circuits" respectively.

The point in any given normal cycle which determines whether subsequent carrier movement is controlled by the forward circuit block or the reverse circuit block is when the platform 80 either rises to lift a load from the load channels or lowers to deposit a load thereon. In either event, a crossover switch means is actuated which causes the forward circuit block to be de-energized and the reverse circuit block to be energized. Thus, if the carrier is sent to a selected load support means or a P & D station to pick up a load, the platform 80 will be initially in a lowered position when the extractor enters under a load and will cause energization of the reverse circuit block when it rises to lift the load off of the channel supports. The reverse circuits will then cause the carrier to return to the start position. If the carrier is sent with a load to a selected load support means or a P & D station, the platform 80 will be initially in a raised position and its subsequent lowering will cause energization of the reverse circuit block and the return of the carrier to the start position.

Referring now particularly to FIG. 1 of the drawings, the storage frame 10 as herein illustrated is adapted for the storage of three different size loads of the type illustrated in FIG. 2 at 28, 29 and 30. The first three levels of the load support means 12 are designated for the storage of the lowest type loads 28 which are sufficiently low to be stored vertically between two adjacent of said load support means. These first three load support means are respectively indicated at L1, L2 and L3. The fourth and sixth levels of the load support means 12 are designated to receive medium height loads 29, and are indicated at M1 and M2 respectively. The eighth highest load support means 12 is designated for the storage of high loads 30 and is indicated at H. It will be understood that the corresponding load support means 12' on the opposite side of the aisle are similarly adapted or designated to receive different size loads as indicated at L1', L2', L3', M1', M2', and H'. All of the support means aligned in a direction parallel with the aisle at any given level are adapted to receive the same size loads.

Referring particularly to FIGS. 1 and 4, the vertically movable frame 60 carries two limit switches, an upper limit switch 112 and a lower limit switch 113. The mast 43 of the horizontally movable frame 40 carries a pair of trips 112', so positioned as to trip the limit switch 112, and a trip 113' which is out of vertical alignment with the trips 112' and so positioned as to trip the limit switch 113 (FIG. 2). The trips 112' are positioned generally horizontally opposite the load support means M1–M1' and M2–M2', and the trip 113' is positioned generally horizontally opposite the load support means designated H–H'. When the load carrier is directed by the forward circuit block 110 to a level designated to receive a medium size load 29, the upper limit switch 112 is tripped or closed by a trip 112'; and when said load carrier is directed to a level adapted to receive a high load 30, the lower limit switch 113 is tripped by the trip 113'.

Figure 6:
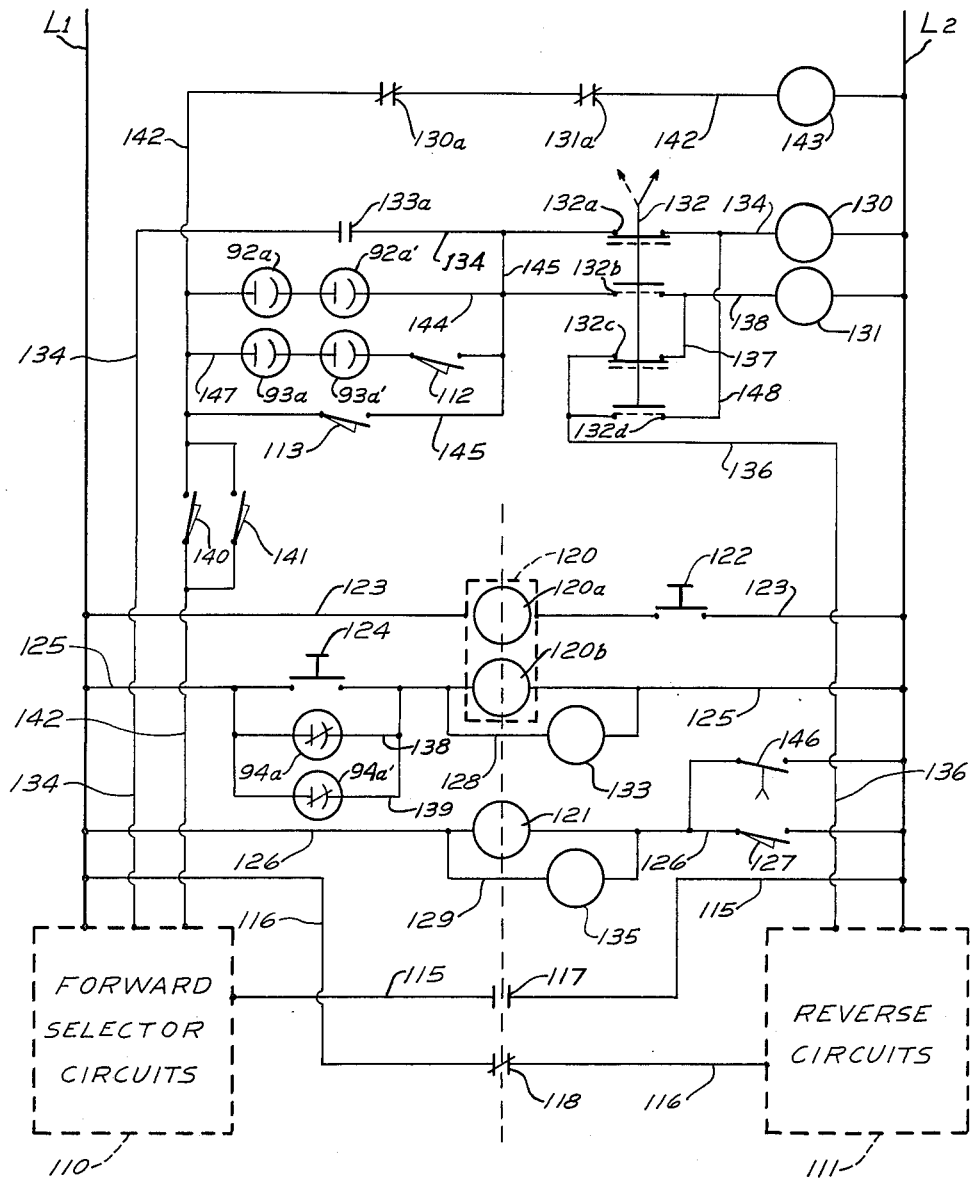
FIG. 6 is an electrical control diagram for the apparatus of this invention.

Referring now to the electrical diagram of FIG. 6, a pair of main leads L1 and L2 are provided for energizing the forward selector circuits in the forward circuit block 110 and the reverse circuits in the reverse circuit block 111. The forward circuit block 110 is energizable from the lead L1 through a line 115 which is connected to the other lead L2, and the reverse circuit block 111 is energizable from the lead L2 through a line 116 which is connected to the lead L1. The lines 115 and 116 have contacts 117 and 118 respectively interposed therein which said contacts are controlled by a latching coil means 120 and unlatching coil means 121. The latching coil means 120 is represented by two coils 120a and 120b both of which are energizable simultaneously by closing a manual push button switch 122 interposed in a line 123 connected across the leads L1 and L2. The coil 120b is energizable separately by a push button switch 124 which is interposed in a line 125 also connected across the leads L1 and L2. The switches 122 and 124 are adapted to automatically open after their release, and the momentary energization of either the latching coil means 120 as a whole or the latching coil 120b alone is adapted to close the contacts 117 and open the contacts 118. It will be understood that the coils 120a, 120b and 121 represent in simplified form a greater number of coils, relays, switches, etc. which are adapted to effect control circuits fully described in the above copending application.

The unlatching coil 121 is connected across the leads L1 and L2 by a line 126 which has interposed therein the above referred to crossover switch means, here designated as 127. The closing of said crossover switch energizes the unlatching coil 121 thereby opening the contacts 117 and closing the contacts 118 as illustrated in the drawings.

Since there are P & D stations and load support means on both sides of the aisle, direction coil means are provided for causing the extractor to move either right or left from the vertically movable frame 60 as said carrier is viewed in FIG. 1. For movement to the right, a coil 130 is energized and for movement to the left, a coil 131 is energized. These direction determining coils are initially controlled by selector switch 132 having 4 sets of contacts 132a, 132b, 132c, and 132d. With the selector switch 132 turned to the full line position as herein illustrated, the extractor will service a P & D station or a load support means on the right, and with said selector switch in the dotted line position as illustrated, said extractor will service a P & D station or a load support means on the left.

The remainder of the electrical diagram will best be understood in connection with a description of the operation of the carrier. It will be assumed that the carrier is positioned at the start position between the P & D stations 13 and 13' with the vertically movable frame 60 and the extractor 65 disposed a little below the channel members 37 and 37'. Since the selector switch 132 is positioned to energize the coil 130 and cause the extractor to move to the right, it will be further assumed that a load to be picked up by the carrier has been positioned on the P & D station 13 by any suitable means such as a lift truck, crane, or the like. An operator then pushes the button 124 thereby energizing the latching coil 120b to close the contacts 117 and open the contacts 118. This isolates the reverse circuit block 111 and energizes the forward circuit block 110 to the extent necessary to operate the vertical driving motor 62 and the extractor motor 74 whereby said extractor is moved upwardly and to the right at the P & D station 13. Operation of the horizontal driving motor 49 is not, of course, necessary for this cycle since no movement of the horizontally movable frame 40 is now needed. Closing of the push button switch 124 is also momentarily energizing a latching coil 133 which is connected in parallel with the latching coil 120b by a line 128. Coil 133 closes a pair of contacts 133a thereby completing a circuit from the forward circuit block 110 through a line 134, said contacts 133a, contacts 132a of selector switch 132, and coil 130 to the lead L2. The forward selector circuits then cause the vertically movable frame 60 to move upwardly, and the direction coil 130 causes the extractor to move to the right. After the extractor is fully extended into the channel members 37, the forward selector circuits cause the platform 80, initially in its lower position, to rise thereby lifting the load off of the channel members 37 while at the same time momentarily closing the crossover switch 127. Closing of said crossover switch energizes the unlatching coil 121 thereby opening the contacts 117 and closing the contacts 118 while at the same time energizing a second unlatching coil 135 which is connected in parallel with said unlatching coil 121 by a line 129. The effect of energizing coil 135 is to reopen the contacts 113a in the line 134. The opening of the contacts 117 isolates the forward circuit block 110 and energizes the reverse circuit block 111 across the line 116. This has the effect of energizing the direction coil 131 by a circuit from said block 111 through a line 136, contacts 132c of the selector switch 132, a line 137, and a line 138 in which said direction coil 131 is connected and which connects to the lead L2. Coil 130 is now isolated by the opening of the contacts 133a, and the coil 131 causes the extractor to move toward the left or back into the vertically movable frame 60. Reverse circuits of the reverse circuit block then cause the vertically movable frame to lower whereby the carrier is back in the start position.

If the load being moved from the P & D station 13 toward the aisle 11 (reverse circuit block 11 energized) is excessively high and breaks the light beam Z to the photoelectric cell 94, said excessively high load will be rejected in the following manner. The photoelectric cells 94 and 94' control contacts 94a and 94a' which are connected in parallel with the push button switch 124 by a pair of lines 138 and 139 respectively. These contacts 94a and 94a' are normally closed and are held open by the effect of the light beams from the light sources 97 and 97'. Therefore, when the excessively high load breaks the light beam Z, the contacts 94a close thereby re-energizing the latching coils 120b and 133. Contacts 117 again close while contacts 118 open, and coil 130 is again energized by closing of the contacts 133a. The extractor is consequently caused to move forwardly by the forward selector circuits or, in other words, it is caused to move the load back into the P & D station 13. Once the extractor is fully extended into said P & D station, the platform 80 automatically lowers thereby redepositing the load at said P & D station and at the same time momentarily closing the crossover switch 127. Closing of switch 127 again energizes the unlatching coils 121 and 135 whereby contacts 133a and 117 again open and contacts 118 again close. The reverse circuit block 111, now being energized, causes the extractor to move to the left as before but without carrying the load therewith due to the fact that the platform 80 is in the lowered position. As before, the reverse circuits effect return of all portions of the carrier to the start position.

If a load picked up at the P & D station 13 is low enough to pass safely under the light beam Z, the carrier will be returned to the start position with the platform 80 raised and the load resting upon said platform. By means of selector switches on the console 100, an operator then selects a load support means 12 or 12' at which he desires to deposit the load. It will be assumed that the operator has again selected the right side of the aisle to service and has turned the selector switch 132 to the full line position as illustrated. The operator then depresses the push button switch 122 which thereby energizes all of the latching coil means 120 including latching coil 120a and latching coil 120b. The forward circuit block is again energized by the closing of contacts 117 and the opening of contacts 118. Since latching coil 133 has not been energized, contacts 133a remain open and coil 130 cannot be energized across the contacts 132a of the selector switch 132. With both the coil 120a and 120b energized, the forward selector circuits now cause the sequential operation of all of the motors 49, 62 and 74. Horizontal drive motor 49 first drives the carrier along the aisle until the horizontally movable frame reaches the selected vertical row of load support means. The vertical drive motor 62 then moves the vertically movable frame 60 upwardly to the level of the selected load support means 12. At this point, one of a pair of leveling switches 140 and 141 is caused to close by the carrier being in the correct vertical position. Switches 140 and 141 are mounted to move with the vertically movable frame 60 and to position the carrier relative to either the right-hand or left-hand load support means.

As shown in FIG. 1, the limit switch 140 is adapted to position the carrier relative to the load support means on the right side of the aisle and would be the switch which closes in the instant case. The closing of switch 140 completes a circuit from the forward circuit block 110 through a line 142, said switch 140, pairs of normally closed contacts 130a and 131a controlled respectively by the coils 130 and 131, and a timer coil 143 to the lead L2. A circuit is simultaneously formed through a line 144, pairs of normally open contacts 92a and 92a' of the lowermost photoelectric cells 92 and 92' respectively held closed by the light sources 95 and 95', a line 145, contacts 132a of the selector switch 132, and coil 130 to lead L2. Energized coil 130 immediately opens the normally closed contacts 130a thereby isolating the timer coil 143. The direction coil 130 then causes the extractor 65 to move to the right into the selected load support means for depositing the load thereat. Lowering of the platform 80 to deposit the load momentarily closes the crossover switch means 127 thereby energizing the unlatching coil 121 to reverse the contacts 117 and 118 and energize the reverse circuit block 111. Coil 131 is energized as before to cause reverse movement of the extractor, and the reverse circuits automatically lower the vertical frame to its horizontal running position and cause the horizotnally movable frame 40 to move back to the start position.

If the loaded carrier has been sent to a load support means at a level designated L1, L2, or L3, and the load is low enough in height to pass under the light beam X as illustrated in FIG. 5, the above normal cycle of operation will be carried out. A circuit will be maintained across the line 144 to keep the coil 130 energized until the crossover point is reached because the light sources 95 and 95' maintain the contacts 92a and 92a' of the photoelectric cells in the closed position. However, if the load being moved by the extractor 65 into the load support means is excessively high, it will break the light beam X thereby allowing the normally open contacts 92a to open and isolate the direction coil 130. De-energization of coil 130 allows the contacts 130a to close thereby again completing the circuit to the timer coil 143. Said timer coil controls a timer switch 146 which is connected in parallel with the crossover switch 127 and which said timer switch closes a predetermined time after the timer coil 143 is energized. Closing of this timer switch energizes the unlatching coil 121 thereby opening the contacts 117 and closing the contacts 118 to cause energization of the reverse circuit block 111 and return of the carrier to the start position. Thus the entire carrier is reversed before the oversized load moves into the selected load support means whereby said oversized load is returned with the carrier to the start position.

The reversing operation immediately described above would take place, if, for example, the operator were to mistakenly direct a medium size load 29 or a large size load 30 to a load support means designated to receive only small loads. The inadvertent loading of an oversized load at a load level such as L1 would result in a collision of the load being delivered with a load already positioned at L2 or L3. If L2 and L3 are empty, an oversized load deposited at L1 would interfere with a subsequent attempt to load at L2 or L3. The above described automatic load sensing and reversing of the carrier prevents such collosion, and by promptly returning the oversized load to the start position directs the operator's attention to the fact that the load delivered was, in fact, too large for the load support means to which it was directed.

A medium size load 29 would ordinarily be directed to a load support level designated M1 or M2. In such instances, depressing the push button switch 122 closes the contacts 117 and opens the contacts 118 whereby the forward circuit block is energized as before and the carrier is sent along the aisle to the selected vertical row of load suport means and then vertically to the level of the selected suport means. At this point, the right-hand leveling switch 140 closes whereby the timer coil 143 is energized across the line 142 and the coil 130 is energized through the lines 144, 145, and 134 with the timer coil being immediately isolated by opening of the normally closed contacts 130a. Also, at the level M1 or M2 the switch 112 is closed by a trip 112'. As shown in the diagram, switch 112 is connected across the lines 142 and 145. Connected in series with the limit switch 112 are normally open contacts 93a and 93a' of the photoelectric cells 93 and 93' respectively which said contacts are held closed by the light sources 96 and 96'. When the switch 112 closes, another circuit is formed to the coil 130 from the forward circuit block 110 by way of lines 142, 147, 145, and 134. Thus when the extractor moves to the right and the load 29 breaks the light beam X of the photoelectric cell 92 and thereby opens the contacts 92a, coil 130 remains energized provided said medium size load does not break the light beam Y which activates the photoelectric cell 93. If, however, the load is a large size load 30 and breaks both the light beams X and Y, the coil 130 will be deenergized, the timer coil 143 will be energized, the timer contacts 146 will close, the unlatching coil 121 will be energized, and the reverse circuits will be establisehd whereby the carrier is caused to return to the start position.

Because all of the loads above a maximum height are sensed and rejected at the P & D station, resensing of high loads at a storage level H or H' is not necessary. If a high load is properly directed to the level H, the limit switch 113, which is interposed in the line 145 in parallel with the lines 144 and 147, will close to complete a circuit across the line 134 to the direction coil 130. The high load will then be moved into the storage frame with the empty carrier returning to the start position as in any normal cycle of operation. The only time that a high load is rejected within the storage frame 10 is when the operator inadvertently directs it to a load level adapted to receive only medium or low loads.

It will be readily understood that if the operator wishes to load on the left side of the aisle, this may be readily done by turning the selector switch 132 to the dotted line position whereby the contacts 132a will be open, contacts 132b will be closed, contacts 132c will be open and contacts 132d will be closed. With the selector switch in the dotted line position, it will be readily understood that circuits formerly completely across the line 134 to energize the coil 130 will now be completed across the line 138 to energize the coil 131. Similarly, circuits completed through the reverse circuit block 111 formerly completed by line 137 to line 138 will now be completed across the now closed contacts 132d and a reversing line 148 to the line 134 and the coil 130. In all other respects, the electrical system disclosed in FIG. 6 operates in the same manner as disclosed above in connection with the full line position of the selector switch 132.

To summarize the effect of the load sensing apparatus herein disclosed and illustrated, loads above a maximum height are rejected at a P & D station by the photoelectric cells 94 and 94' as the extractor is moving under the influence of the reverse circuit block 111 to move the load toward the aisle. In this case, the forward circuit block 110 in re-energized, the load is put back on the P & D station, and the empty carrier is returned to the start position in the normal manner. Low and medium size loads are sensed for height as the extractor moves them into a selected load support means under the influence of the energized forward circuit block 110. In this case, the reverse circuit block 111 is energized before the load is deposited whereby the carrier will return to the start position with the oversized load still positioned on the platform 80.

FIG. 3 of the drawings shows a modified storage frame 10a which differs from the storage frame 10 in that the load channels 27 which define load support means vertically between load support levels M1 and M2, M2 and H, or above H have been eliminated. Such elimination of unused load support means effects a saving in material and aids the operator of the load carrier 15 in readily visually determining what height load is to be stored at any given load support level. The storage frame 10, on the other hand, affords the advantage of flexibility because the load support level designations can be readily changed or varied simply by changing the positions of the trips 112' and 113' on the mast 43.

It will be understood that many changes in the details of the invention as herein illustrated and described may be made without, however, departing from the spirit thereof or the scope of the appended claims.

What is claimed is:

1. In an automatic warehousing system, a plurality of load supports and a carrier for transporting a load to a selected one of said supports; said carrier having transferring means for transferring a load horizontally from said carrier onto said selected support; said carrier having means adjacent to its exit end supporting horizontally spaced coacting photoelectric cell and light source means in a position whereby the beam of said light source means is disposed transversely to the path of movement of a load moving off of said carrier and spaced above the level of said transferring means; said transferring means responsive to actuation of said photoelectric cell means whereby when a load being moved off of said carrier is of sufficient height to break said beam, the motion of said transferring means is stopped.

2. In an automatic warehousing system, a plurality of load support means and a carrier for transporting a load to a selected one of said support means; said carrier having an extractor movable horizontally into said support means for transferring a load from said carrier onto said support means; power means for moving said extractor; said carrier having means supporting horizontally spaced coacting photoelectric cell and light source means in a position whereby the beam of said light source means is disposed transversely to the path of movement of a load moving off of said carrier and disposed vertically above the level of said extractor; said power means responsive to actuation of said photoelectric cell whereby when a load being moved by said extractor is of sufficient height to break said beam, the motion of said extractor is stopped.

3. In an automatic warehousing system, a plurality of load support means and a carrier for transporting a load to a selected one of said support means; said carrier having an extractor movable horizontally in a first direction out of said carrier and toward said support means for transferring a load from said carrier onto said support means and movable horizontally in a second direction away from said support means and toward said carrier for transferring a load from said support means onto said carrier; reversible power means for moving said extractor; said carrier having means supporting horizontally spaced coacting photoelectric cell and light source means in a position whereby the beam of said light source means is disposed transversely to the path of movement of a load moving between said carrier and said support means and is disposed vertically above the level of said extractor; said power means responsive to actuation of said photoelectric cell means whereby when a load being moved by said extractor in said first direction is of sufficient height to break said beam, the motion of said extractor is reversed and said extractor is moved in said second direction.

4. In an automatic warehousing system, a plurality of load support means; means defining a pick-up and discharge station; a carrier; said carrier having a horizontally movable extractor for transferring a load from said carrier onto a selected one of said support means; power means moving said carrier and extractor in sequential movements in one direction from a start position adjacent to said pickup and discharge station for delivering a load to a selected support means and in another direction for returning said extractor and carrier to said start position; said carrier having means supporting horizontally spaced coacting photoelectric cell and light source means in a position whereby the beam means of said light source means is disposed transversely to the path of movement of a load moving away from said carrier and disposed vertically above the level of said extractor; said power means responsive to actuation of said photoelectric cell means whereby when a load being moved by said extractor in said one direction is of sufficient height to break said beam means, the motion of said extractor and said carrier is reversed and said carrier is caused to move back to said start position.

5. In an automatic warehousing system, a plurality of load support means; means defining a pick-up and discharge station; a carrier; said carrier having a horizontally movable extractor for transferring a load from said carrier onto a selected one of said support means; power means moving said carrier and extractor in sequential movements in one direction from a start position adjacent to said pick-up and discharge station for delivering a load to a selected support means and in another direction for returning said extractor and carrier to said start position; said carrier having means supporting horizontally spaced coacting photoelectric cell and light source means in a position whereby the beam means of said light source means is disposed transversely to the path of movement of a load moving away from said carrier and disposed vertically above the level of said extractor; said power means responsive to actuation of said photoelectric cell means whereby when a load being moved by said extractor in said one direction is of sufficient height to break said beam means, the motion of said extractor and said carrier is reversed and said carrier is caused to move back to said start position; different of said support means being adapted to support loads of different heights; said photoelectric cell and the light source means comprising a plurality of coacting pairs of photo-electric cells and light sources disposed at different heights corresponding to the different height loads adapted to be supported by said support means; and control means including means responsive to alignment of said carrier with certain of said support means cooperant with said photoelectric cells means whereby only a load exceeding a height designated for a selected load support means will cause the motion of said extractor to reverse.

6. In an automatic warehousing system, a storage frame for storing a plurality of loads; a pick-up and discharge station; a carrier normally positioned adjacent to said pick-up and discharge station; said carrier having an extractor movable horizontally out of said carrier and into said pick-up and discharge station for picking up a load therefrom and transferring it to said carrier for subsequent storing in said frame; power means for moving said extractor; said carrier having means supporting horizontally spaced coacting photoelectric cell and the light source means in a position whereby the beam of said light source means is disposed transversely to the path of movement of a load moving onto said carrier; said power means responsive to actuation of said photoelectric cell means whereby when a load being moved onto said carrier from said pick-up and discharge station is of sufficient height to break said beam, the motion of said extractor is stopped.

7. In an automatic warehousing system, a storage frame for storing a plurality of loads; a pick-up and discharge station; a carrier normally positioned adjacent to said pick-up and discharge station; said carrier having an extractor movable horizontally out of said carrier and into said pick-up and discharge station for picking up a load therefrom and transferring it to said carrier for subsequent storing in said frame; power means for moving said extractor; said carrier having means supporting horizontally spaced coacting photoelectric cell and light source means in a position whereby the beam of said light source means is disposed transversely to the path of movement of a load moving onto said carrier; said power means responsive to actuation of said photoelectric cell means whereby when a load being moved onto said carrier from said pick-up and discharge station is of sufficient height to break said beam, the motion of said extractor is stopped; said power means being reversible; control means normally causing said extractor to move forwardly into said pick-up and discharge station, pick up a load, and return automatically with said load to its normal position; and said control means so responsive to actuation of said photoelectric cell means during return movement of said extractor as to cause said extractor to immediately move forwardly, redeposit said load on said pick-up and discharge station, and return automatically without said load to said normal position.

8. In an automatic warehousing system, a plurality of load support means arranged in vertical and horizontal rows and having an aisle alongside thereof; a load carrier movable vertically and horizontally in said aisle to any selected load support means; said carrier having an extractor extendible laterally out of said aisle at a selected load support means for transferring a load from said carrier onto said selected load support means; said carrier having means supporting horizontally spaced coacting photoelectric cell and the light source means whereby the beam of said light source means is directed transversely to the path of movement of a load moving off of said carrier and is disposed vertically above the level of said extractor; said carrier having control means responsive to actuation of said photoelectric cell means whereby when a load being moved by said extractor is of sufficient height to break said light beam; the motion of said extractor is stopped.

9. An automatic storage apparatus comprising a storage frame having like load support means arranged in vertical and horizontal rows and means defining an aisle alongside thereof; means providing a pick-up and discharge station at one end of said aisle; an automatic load carrier movable vertically and horizontally in said aisle and having a laterally movable extractor for transferring a load laterally between said aisle and a load support means or said pick-up and discharge station; said carrier movable in automatic cycles of operation beginning and ending at a start position adjacent to said pick-up and discharge station and including picking up or depositing a load at a load support means or said pick-up and discharge station; said carrier having a plurality of photoelectric cells and complementary light source means disposed on each side of the path of movement of said extractor adjacent to the laterally directed end of said carrier which is directed toward said storage frame; said light source means directing light beams horizontally at different levels above the level of said extractor in such manner as to be broken by loads exceeding different maximum heights; control means for cycling said carrier responsive to said photoelectric cell whereby the breaking of selected of said beams causes reversal of the cycling and return of said carrier to said start position; at least one of said photoelectric cells effective to reverse said cycling when an oversized load is being moved from said pick-up and discharge station onto said carrier, and at least one other of said photoelectric cells effective to reverse said cycling when an oversized load is being moved from said aisle onto a selected load support load means.

10. An automatic storage apparatus comprising a storage frame having like load support means arranged in vertical and horizontal rows laterally on either side of a central aisle; means providing pick-up and discharge stations on either side of and at one end of said aisle; an automatic load carrier movable vertically and horizontally in said aisle and having a laterally movable extractor for transferring a load laterally in either direction between said aisle and a load support means or a pick-up and discharge station; said carrier movable in automatic cycles of operation beginning and ending at a start position between said pick-up and discharge stations and including picking up or depositing a load at a load support means or a pickup or discharge station; said carrier having a plurality of photoelectric cells and complementary light source means disposed on each side of the path of movement of said extractor adjacent to the laterally directed end of said carrier; said light source means directing light beams horizontally at different levels above the level of said extractor in such manner as to be broken by loads exceeding different maximum heights; control means for cycling said carrier responsive to said photoelectric cells whereby the breaking of selected of said beams causes reversal of the cycling and return of said carrier to said start position; at least one of said photoelectric cells at each end of said carrier effective to reverse said cycling when an oversized load is being moved from one of said pick-up and discharge stations onto said carrier, and at least one other of said photoelectric cells at each end of said carrier effective to reverse said cycling when an oversized load is being moved from said aisle onto a selected load support means.

11. In an automatic warehousing system, a frame providing a plurality of storage load support means; means providing a pick-up and discharge station having terminal load support means; a carrier movable between a start position and any selected one of said support means; said carrier having a laterally extendible extractor for transferring a load onto or off of said support means; said extractor having a vertically movable lift frame for depositing or picking up a load at any of said support means; said carrier having a pair of upright supports disposed on either side of the path of movement of said extractor whereby a load moved by said extractor passes between said supports; a pair of photoelectric cells mounted to one of said upright supports and a pair of light source means mounted to the other of said upright supports coacting respectively with said cells; said cells and said light source means so arranged as to provide two light beams disposed horizontally above the level of said extractor at different levels and across the path of movement of said extractors; power means for operating said carrier; control means for cycling said carrier including first circuit means for moving said carrier from said start position into a position aligned with a selected support means, moving said extractor laterally, and moving said lift frame vertically to deposit or pick up a load; said control means including second circuit means for retracting said extractor and moving said carrier back to said start position; said control means including means responsive to the vertical movement of said lift frame automatically actuating said second circuit means when a load is deposited or picked up; said control means responsive to the uppermost of said cells whereby when an oversized load moving from said pick-up and discharge station breaks the uppermost beam, said second circuit means is de-energized and said first circuit means is energized to cause said load to be redeposited on said terminal load support means; said control means responsive to the other of said cells whereby when a load which is oversized for a selected storage load support means breaks the other beam when it is being moved onto said support means, said first circuit means is de-energized and said second circuit means is energized to cause said carrier to return with said load to said start position.

12. In an automatic warehousing system, means defining a plurality of load supports disposed at different levels; a vertical frame disposed alongside of said load supports and a carrier movable up and down said frame to the different levels of said supports; said carrier having transfer means for transferring a load between said carrier and any of said supports; means supporting a pair of photoelectric cells and coacting light sources adjacent to the exit end of said carrier and transverse to the path of a load moving off of said carrier onto a support, said light sources directing light beams horizontally at different levels; cycle control means for moving said carrier in a normal cycle of operation from a start position to a selected load support for depositing or retrieving a load thereat and including reversing means for automatically returning said carrier to said start position; the lowermost of said cells, when actuated by its corresponding light source, comprising actual circuit means for actuating said cycle control means to maintain said normal cycle of said carrier to and from a selected support; the uppermost of said cells, when actuated by its corresponding light source, comprising potential circuit means for actuating said cycle control means to maintain said normal cycle; a switch carried by said carrier actuatable by trips carried at certain levels on said vertical frame corresponding to certain of said supports; said uppermost cell responsive to actuation of said switch means to become actual circuit means whereby at selected load supports determined by the positions of said trips, said normal cycle is maintained when a load moving from said carrier breaks said lowermost beam and passes under said uppermost beam and whereby said normal cycle is interrupted only when said load is of such height as to break both of said beams.

13. In an automatic warehousing system as set forth in claim 12; a second switch carried by said carrier actuatable by other trips carried at certain other levels on said vertical frame corresponding to certain other of said supports; said second switch actuatable to complete circuit means which by-pass said circuit means at both said cells whereby a load which breaks both of said beams is storable at said certain other of said supports.

14. In an automatic warehousing system as set forth in claim 12; said cycle control means including means actuating said reversing means to cause return of said carrier to said start position in response to interruption of said normal cycle of operation.

15. In an automatic warehousing system, at least one load support; a carrier for transporting a load to said support; said carrier having transferring means for transferring a load horizontally between said carrier and said support; said carrier having means responsive to a load exceeding a predetermined height being moved between said carrier and said support and actuated thereby; and means responsive to said first mentioned means being actuated and causing said transferring means to stop.

16. In an automatic warehousing system, a plurality of load supports; a carrier for transporting a load to a selected support of a predetermined height; said carrier having transferring means for transferring a load horizontally between said carrier and said support; said carrier having means reactive to a load exceeding said predetermined height being moved between said carrier and said support; and means responsive to said first mentioned means causing said transferring means to stop when said first mentioned means is activated.

17. In an automatic warehousing system, a plurality of load supports and a carrier for transporting a load to a selected one of said supports; said carrier having transferring means for transferring a load horizontally from said carrier onto said selected support; said carrier having means adjacent to its exit end supporting horizontally spaced, coacting, ray-responsive means and means emitting an interruptable ray in a position whereby said ray is disposed transversely to the path of movement of a load moving off of said carrier and spaced above the level of said transferring means; said transferring means responsive to actuation of said ray-responsive means whereby when a load being moved off of said carrier is of sufficient height to interrupt said ray, the motion of said transferring means is stopped.

18. In an automatic warehousing system, a plurality of load supports and a carrier for transporting a load to a selected one of said supports; said carrier having transferring means for transferring a load horizontally from said carrier onto said selected support; said carrier having means adjacent to its exist end supporting horizontally spaced, coacting, energy beam responsive means and means emitting an interruptable beam of energy in a position whereby said beam is disposed transversely to the path of movement of a load moving off of said carrier and spaced above the level of said transferring means; said transferring means responsive to actuation of said energy beam responsive means whereby when a load being off of said carrier is of sufficient height to interrupt said beam, the motion of said transferring means is stopped.

19. In an automatic warehousing system, a plurality of load supports and a carrier for transporting a load to a selected one of said supports; a different of said supports being adapted to support loads of different heights; said carrier having transferring means for transferring a load horizontally from said carrier onto said selected support; said carrier having means adjacent to its exit end supporting horizontally spaced, coacting photoelectric cell and light source means in a position whereby the beam means of said light source means is disposed transversely to the path of movement of a load moving off of said carrier and spaced above the level of said transferring means; said photoelectric cell and light source means comprising a plurality of coacting pairs of photoelectric cells and light sources with individual light source beams disposed at different heights corresponding to the different height loads adapted to be supported by said supports; and control means including means responsive to alignment of said carrier with certain of said supports cooperant with said photoelectric cell means whereby only a load exceeding a height designated for a selected load support will cause the motion of said transferring means to stop.

20. In an automatic warehousing system, a plurality of load supports; at least some of said load supports affording openings of different heights; a carrier for transporting loads to said supports; said carrier having transferring means for transferring a load between said carrier and a support; detecting means on said carrier selectively responsive to loads exceeding said different heights; means for controlling the movement of said transferring means responsive to said detecting means; when excessively high loads are detected, to stop said transferring means; and control means responsive to alignment of said carrier with said support, cooperant with said detecting means, for individually detecting an excessively high load at each load support.

References Cited by the Examiner

UNITED STATES PATENTS

| | | | |
|---|---|---|---|
| 1,977,732 | 10/1934 | Mattler | 198—232 X |
| 2,691,448 | 10/1954 | Lontz | 214—16.14 |
| 3,089,594 | 5/1963 | Early | 209—111.7 |

GERALD M. FORLENZA, *Primary Examiner.*